(12) United States Patent
Ditto

(10) Patent No.: US 6,270,352 B1
(45) Date of Patent: Aug. 7, 2001

(54) ADAPTIVE PROBLEM SELECTION

(76) Inventor: James W. Ditto, 1849-B S. Lee St., Lakewood, CO (US) 80232

( * ) Notice: Subject to any disclaimer, the term of this patent is extended or adjusted under 35 U.S.C. 154(b) by 0 days.

(21) Appl. No.: 09/293,220

(22) Filed: Apr. 16, 1999

(51) Int. Cl.[7] ................................................. G09B 19/00
(52) U.S. Cl. .......................... 434/118; 434/322; 434/362; 434/188; 434/323
(58) Field of Search ..................................... 434/322, 323, 434/350, 362, 118, 188

(56) References Cited

U.S. PATENT DOCUMENTS

| | | |
|---|---|---|
| 4,117,607 | 10/1978 | Gill . |
| 4,193,210 | 3/1980 | Turnquist . |
| 4,713,009 | 12/1987 | Borenson . |
| 4,946,391 | 8/1990 | Hawkins et al. . |
| 5,261,823 * | 11/1993 | Kurokawa ........................ 434/323 X |
| 5,310,349 * | 5/1994 | Daniels et al. .................... 434/350 X |
| 5,597,312 | 1/1997 | Bloom et al. . |
| 5,681,170 * | 10/1997 | Rieber et al. ..................... 434/355 X |
| 5,727,950 * | 3/1998 | Cook et al. ........................... 434/350 |
| 5,743,746 | 4/1998 | Ho et al. . |
| 5,827,066 | 10/1998 | Henter . |
| 5,870,731 * | 2/1999 | Trif et al. ............................ 706/52 X |
| 5,902,116 * | 5/1999 | Rieber et al. ..................... 434/355 X |
| 5,944,530 * | 8/1999 | Ho et al. ............................ 434/236 X |

* cited by examiner

*Primary Examiner*—Valencia Martin-Wallace
*Assistant Examiner*—Chanda Harris
(74) *Attorney, Agent, or Firm*—William P. O'Meara; Guy K. Clinger; Klaas, Law, O'Meara & Malkin, P.C.

(57) ABSTRACT

A method and apparatus for selecting a category from a plurality of categories, where each category comprises a number of elements, and corresponds to a category performance determinant that represents a measurement associated with a given category, and where a category performance determinant biases the selection of a given category.

40 Claims, 7 Drawing Sheets

ADAPTIVE PROBLEM SELECTION

FIELD OF THE INVENTION

This invention pertains to the field of educational software, and more particularly to an apparatus and a method for selecting problems and categories of problems that is adapted to a student's performance on those problems and categories.

BACKGROUND OF THE INVENTION

It has been a long held belief of many that repetition is the key to mastery of a subject. Also known as the "practice makes perfect" theory, the more frequently a problem is presented to a student, the more successful the student will be at solving the problem. This can be especially true in the area of grade school mathematics. Where mathematical equations can initially be a conglomeration of meaningless numbers to students, their repeated exposure to problems assist in their ability to eventually solve a given problem correctly.

As a result, a plethora of computer-based programs have been created which are premised on the "practice makes perfect" theory. Using a variety of audio and visual mechanisms, the underlying approach of these programs has been to force feed problems to a student, and to repeat any problems that a student misses. However, since each student possesses different areas of difficulty, and learns at a different pace, mere presentation and repetition of a problem is not always effective. For instance, if a student misses problem A once and problem B five times, random repetition will dictate that problem A has an equal probability of being selected as problem B. This can be ineffective because it does not focus a student's attention on a particular problem that he or she is having the greatest difficulty with, that is, problem B, and therefore does not consider the student's actual performance in selecting problems.

One solution is to repeat a missed problem in variable intervals according to the student's performance, where one interval is measured by the presentation of one problem. For example, if a student misses problem A, it will be repeated in a preconfigured interval that is increased if the student correctly answers the problem on the next presentation, or decreased if the student incorrectly answers the problem on the next presentation. If the preconfigured interval is one, then the first sequence of problem presentation following the first time that problem A is missed is:

Repetition 1:
  problem B (INTERVAL 1)
  problem A

If the student correctly answers problem A in Repetition 1, then the interval increases to two, for example, and the sequence of problem presentation following Repetition 1 becomes:

Repetition 2:
  problem B (INTERVAL 1)
  problem C (INTERVAL 2)
  problem A

If the student correctly answers problem A in Repetition 2, then the interval increases to three, for example, and the sequence of problem presentation following Repetition 2 becomes:

Repetition 3:
  problem B (INTERVAL 1)
  problem C (INTERVAL 2)
  problem D (INTERVAL 3)
  problem A If the student answers problem A in any repetition incorrectly, then the previous repetition is repeated, or Repetition 1 if there is no previous repetition. Once the student correctly answers the missed problem for all repetitions, up to a preconfigured maximum number of repetitions, it is not repeated in preconfigured intervals until it is missed again. There can, of course, be intervening repetitions for problems presented during the intervals, the details of which are not discussed herewith. (See expired U.S. Pat. No. 4,193,210 of Turnquist.)

Although this solution presents problem repetition commensurate with the student's performance, it is vulnerable to some degree of predictability as to subsequent presentation of problems because problem presentation under this method is methodical. In other words, if there are 5 problems, A, B, C, D, and E, and a student misses problem A, and then problem B, the missed problems will necessarily be repeated in sequential fashion. Even though there are interval problems to distance the repetition of missed problems, the repetition is nevertheless a sequential event. A need exists, therefore, for an apparatus and a method of selecting a problem that is adapted to a student's performance, such that a problem missed more frequently has a higher probability of being repeated more frequently than a problem missed less frequently, without the predictability that such a problem will necessarily be repeated on any given problem selection.

SUMMARY OF THE INVENTION

This invention is, in general, directed to method and apparatus for biased random selection of a problem or a category of problems based upon a performance measurement. Thus, the invention may comprise an apparatus for selecting a category, comprising a number of computer readable media and computer readable program code on the computer readable media, the program code comprising: program code for determining a category performance determinant for each of a plurality of categories, wherein said plurality of categories comprises a number of elements, and wherein a given category performance determinant corresponds to a given one of said plurality of categories, and wherein the given category performance determinant represents a measurement associated with a given one of said plurality of categories; and program code for making a biased random selection of a category from a plurality of categories, wherein each category performance determinant biases the selection of its corresponding category in the biased random selection.

The invention may also comprise an apparatus for selecting a category, comprising means for determining a category performance determinant for each of a plurality of categories, wherein a given category performance determinant corresponds to a given one of said plurality of categories, and is a measurement associated with a corresponding one of said plurality of categories; and means for making a biased random selection of a category, wherein said biased random selection means comprises means for each category performance determinant to bias the selection of its corresponding category in the biased random selection.

The invention may also comprise an apparatus for selecting a problem, comprising a number of computer readable media and computer readable program code on the computer readable media, the program code comprising: program code for determining a performance number for each of a plurality of problems, wherein a given performance number corresponds to a given one of a plurality of problems, and represent a student's performance on the given problem; and program code for making a biased random selection of a problem from a plurality of problems, wherein each performance number biases the selection of its corresponding problem in said biased random selection.

The invention may additionally comprise an apparatus for selecting a problem, comprising means for determining a performance number for each of a plurality of categories, wherein a given performance number corresponds to a given one of a plurality of problems, and is a measurement of a student's performance on the given one of a plurality of problems; and means for making a biased random selection of a problem, wherein said biased random selection means comprises means for each performance number to bias the selection of its corresponding problem in said biased random selection.

The invention may additionally comprise a method for selecting a problem, comprising determining a performance number for each of a plurality of problems wherein a given performance number corresponds to a given one of a plurality of problems and represents a student's performance on the given one of a plurality of problems; and making a biased random selection of a problem, wherein each performance number biases the selection of its corresponding problem in said biased random selection.

The invention may also comprise a method for selecting a category, comprising determining a category performance determinant for each of a plurality of categories, wherein a given category performance determinant corresponds to a given one of a plurality of categories and represents a measurement associated with a given one of said plurality of categories; and making a biased random selection of a category, wherein each category performance determinant biases the selection of its corresponding category in said biased random selection.

The invention may also comprise a computer data signal embodied in a carrier wave, comprising a category performance determinant determination source code segment comprising code for generating a category performance determinant for each of a plurality of categories, wherein said each of a plurality of categories comprises a number of elements, and wherein a given said category performance determinant corresponds to a given one of a plurality of categories comprising a number of elements and said given category performance determinant represents a measurement associated with a given one of a plurality of categories; and a category selection source code segment comprising code for making a biased random selection of a category from said plurality of categories, wherein each category performance determinant biases the selection of its corresponding category in said biased random selection.

BRIEF DESCRIPTION OF THE DRAWINGS

An illustrative and presently preferred embodiment of the invention is illustrated in the drawings in which.

DESCRIPTION OF PREFERRED EMBODIMENTS

In General

Figure 1:
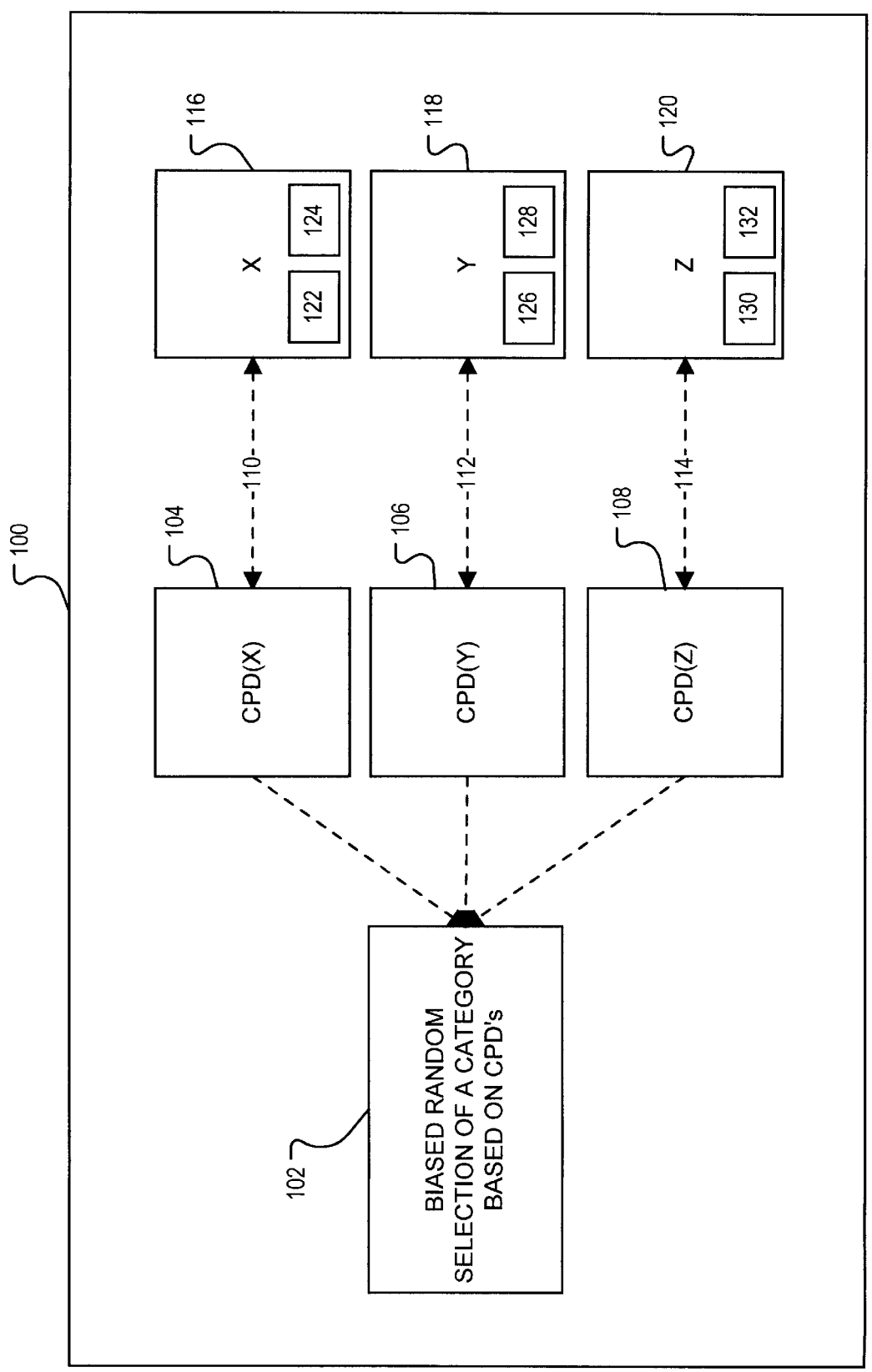
FIG. 1 illustrates an apparatus of adaptive problem selection.

FIG. 1, in general, illustrates an apparatus for selecting a category comprising a number of computer readable media 100 and program code on the computer readable media, where the program code is for: determining a category performance determinant 104,106, 108 for each of a plurality of categories 116,118,120, wherein each of said plurality of categories comprises a number of elements 122, 124,126, 128, 130, 132, and wherein a given category performance determinant corresponds 110, 112,114 to a given one of the plurality of categories, and represents a measurement associated with a given one of the plurality of categories; making a biased random selection 102 of a category from a plurality of categories wherein a category performance determinant biases the selection of a corresponding category in the biased random selection. The code may be provided on any type of computer readable media, including, but not limited to, floppy disks, hard disks, optical discs, compact discs (CD's), digital video discs (DVD's), and server RAMs on a network or on the Internet.

Figure 2:
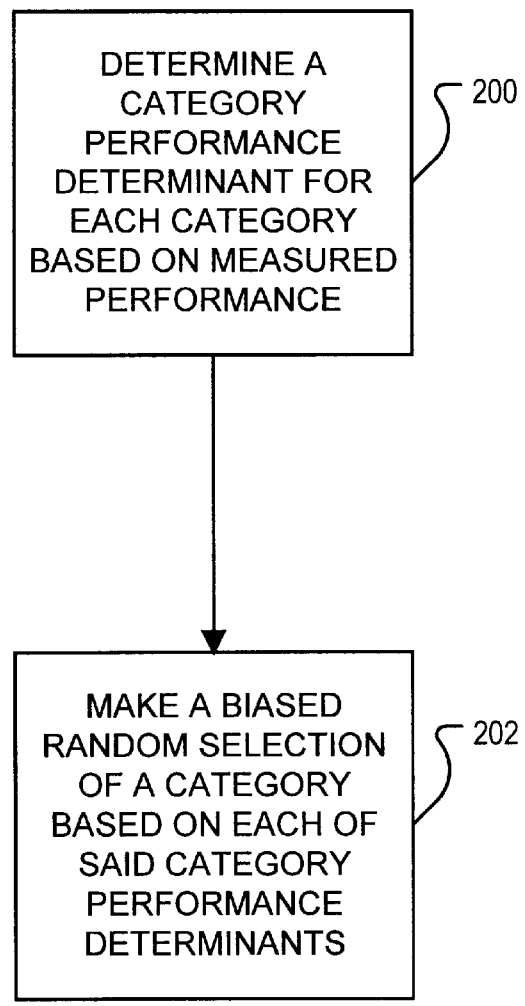
FIG. 2 illustrates a method of adaptive problem selection.

FIG. 2, in general, illustrates a method for selecting a category, comprising determining a category performance determinant for each of a plurality of categories by measuring a performance in each of a plurality of categories 200, and making a biased random selection of a category, where a probability of selection for a given category biases a category's probability of being selected 202.

Figure 7:
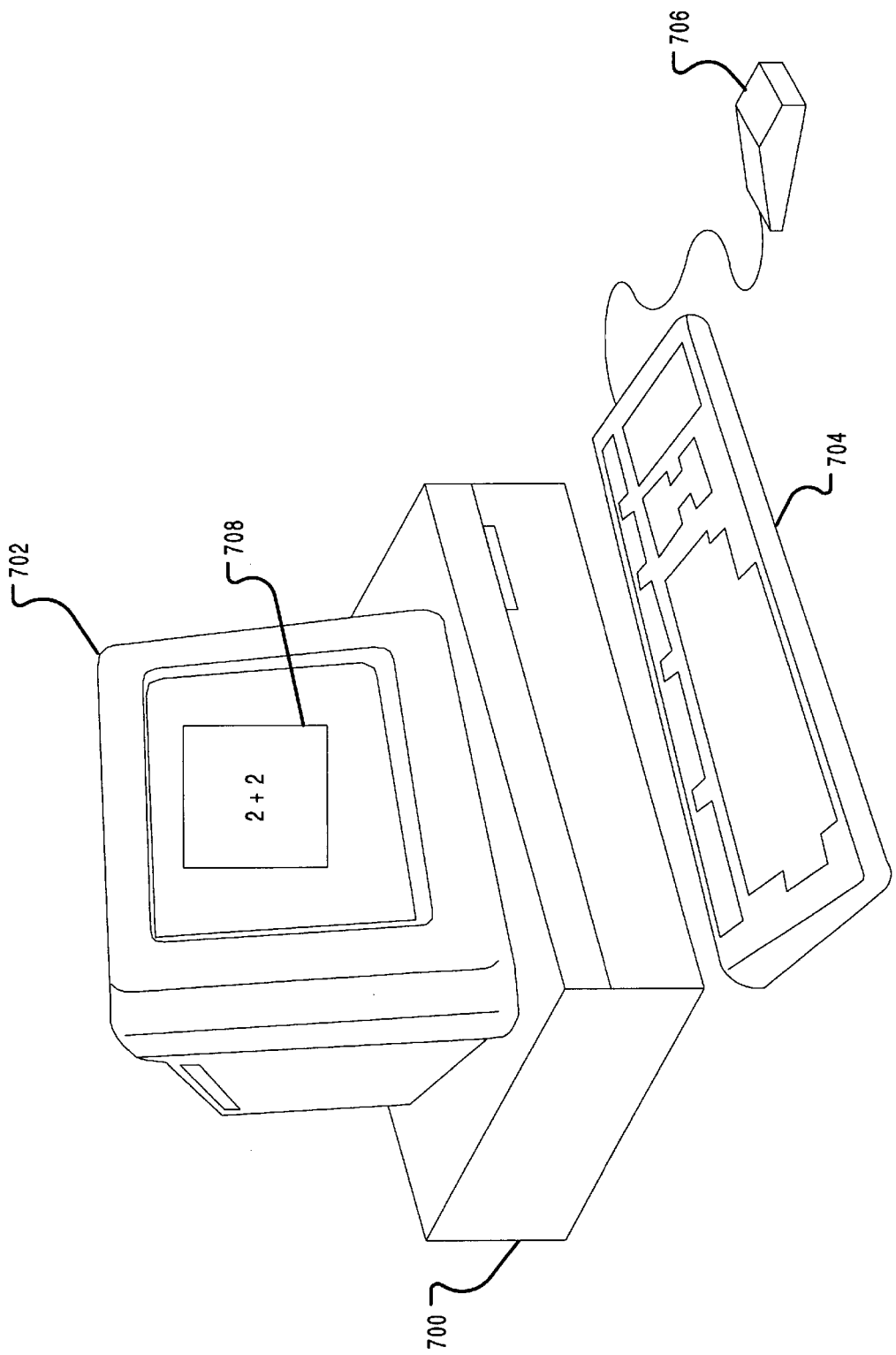
FIG. 7 illustrates user components of adaptive problem selection in preferred embodiments.

In one embodiment, the categories are categories of mathematical problems such as addition, subtraction, counting, etc., and the elements in each category are individual problems, such as "2+2". The measurement associated with a given category is a measurement of a student's performance on problems in that category based on predetermined parameters such as consecutive right answers, average time to solve a problem, etc. Where the performance in a category is relatively poor, problems from that category have a higher probability of being selected on a problem selection than problems from categories where performance was better. As illustrated in FIG. 7, the apparatus may include a computer 700, such as a conventional personal computer; a display 702, such as a CRT for displaying a selected problem 708; and an input device, such as a keyboard 704 and/or mouse 706, which allows the user to input an answer to the selected problem.

DETAILED DESCRIPTION

Introduction

Adaptive problem selection can be utilized in a variety of subjects to develop a student's speed and accuracy in solving problems in those subjects. The student's performance is measured from all attempts he or she has made at solving a particular problem, and is used to focus the student's practice time where most needed. No discipline is completely abandoned, but previously mastered areas are seen less frequently than areas in which the student is having difficulty.

In certain preferred embodiments, adaptive problem selection is used to develop a student's speed and accuracy in solving mathematical problems. In a first preferred embodiment, adaptive problem selection guides the selection of problems. In a second preferred embodiment, adaptive problem selection guides the selection of categories of problems. A category of problems can comprise one problem, in which case adaptive selection of a category is essentially adaptive selection of the problem. A category of problems can also comprise a plurality of problems, in which case the selection of a category can be used to guide the selection of a problem in the category, in a manner similar to a first preferred embodiment. A problem can be a problem that is presented to a student, or it can be a subpart of a problem that is presented to a student.

Math Problem Selection

Adaptive problem selection can be used in various math disciplines, including:
COUNTING
ADDITION
SUBTRACTION
MULTIPLICATION
DIVISION Counting A counting problem type teaches a student basic counting principles. A counting problem to be solved comprises at least one number that is the subject of the counting problem. Each number is selected from one or more categories, wherein each category comprises a range of numbers for counting. In one preferred embodiment, there are 8 categories of numbers, where the categories represent numbers ranging from 1 to 3999. In a counting problem, each number in a category is a problem, and the categories of numbers is a problem set. The problem set and problems are broken down as follows:

Problem Set
  Category 1: 1 to 9
  Category 2: 10 to 14
  Category 3: 15 to 25
  Category 4: 26 to 50
  Category 5: 51 to 99
  Category 6: 100 to 399
  Category 7: 400 to 999
  Category 8: 1000 to 3999

Each counting problem can be presented in various modes as a single number from a category (Modes 1–4), or multiple numbers from one or more categories (Mode 5). In counting Mode 1, a number of objects are displayed, and the student enters the numbers of objects displayed in the answer space. For example, a counting problem for the number 3 can be presented as:

Mode 1—Singles Counting Problem

"How many squares are there?"

ANSWER: 3, where "3" is a problem from Category 1.

In counting Mode 2, a number is displayed, and the student is required to move the correct number of objects representing the number to the answer space. For example, a counting problem for the number 5 can be presented as:

Mode 2—Singles Manipulative Problem

"Move FIVE single objects.", where "FIVE" is a problem from Category 1.

ANSWER:

In counting Mode 3, one or more groups of objects are presented to the student, where each group represents a number of objects, and the student is required to enter the number of objects represented in the answer space. For example:

Mode 3—Group Counting Problem

"Count the Objects."

100 ■

10

ANSWER:

110, where "110" is a problem from Category 6.

In counting Mode 4, one or more groups of objects are displayed, each group having a corresponding number, and the student is required to move the correct number of groups representing a given number to the answer space. For example, a counting problem for the number 110 can be presented as:

Mode 4—Group Manipulative Problem

"Place 110 Objects in the box.", where "110" is a problem from Category 6.

100 ■

10

10

10

ANSWER:

100 ■

10

In counting Mode 5, a group of numbers in numerical and/or text format are presented to the student, and the student is required to place those numbers in a specified order in the answer space. For example:

Mode 5—Number Line Problem

"Place these numbers on the steps in increasing order."
"ten, 5", where "ten" is a problem from Category 2, and "5" is a problem from Category 1.

ANSWER:

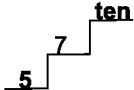

What a Problem Comprises

Singles counting, singles manipulative, group counting, and group manipulative problems comprise one number, so the problem to be solved comprises a single selection of a problem. Number line problems can comprise one or more numbers, where the quantity of numbers used in a problem is a variable that is dependent upon the selected category (see below). In preferred embodiments, the quantity of numbers used in a problem is as follows:

| Category | Quantity of Numbers | Distribution % |
| --- | --- | --- |
| 1 | 1 | 100% |
| 2 | 1 | 50% |
|   | 2 | 50% |
| 3 | 1 | 50% |
|   | 2 | 50% |
| 4–8 | 2 | 100% |

Thus, if Category 2 is selected, then a number line problem will comprise 1 number on 50% of number line problem selections, and 2 numbers on the remaining 50% of number line problem selections. If a number line problem comprises one number, a problem to be solved comprises a single selection of a problem. If a number line problem comprises more than one number, then the problem to be solved comprises multiple selections of a problem, where the number of selections is equal to the quantity of numbers in the problem.

Category and Problem Selection

The selection of a counting category and the selection of a counting problem can both be adaptively selected. In preferred embodiments, a category is randomly selected within the limits of CategoryMax, where CategoryMax is a variable category number at which problems are not selected beyond CategoryMax. The one or more problems selected for each problem to be solved are adaptively selected (to be discussed) when CategoryMax is 1, 2, or 3, allowing for selection from Categories 1–3 (values 1 to 25), and randomly selected when CategoryMax is greater than 3, allowing for selection from Categories 4–8. CategoryMax is initialized to 1, and is increased during the session when the number of consecutive correct answers in the category equal to CategoryMax exceeds a configured value, and decreased at the end of the session if the percentage of misses for that session is less than a configured minimum.

In singles counting, singles manipulative, group counting, and group manipulative problems, a problem can be selected from any category between 1 and CategoryMax. The category to select from is randomly selected, but the problem in Categories 1, 2, and 3 is adaptively selected, and the problem in Categories 4–8 is randomly selected. (Adaptive selection is discussed below.) For example, since CategoryMax starts at 1, the first problem is adaptively selected from Category 1, or the values 1 to 9. Assuming the configured value for increasing CategoryMax is 5, and the student consecutively answers 7 problems correctly out of 9 problems (values 1–9), CategoryMax is increased to 2 on the next pass. On the next pass, a problem can be adaptively selected from Category 1 or Category 2, or the values 1 to 14, where the selection of Category 1 or Category 2 is randomly selected. When CategoryMax reaches 4, a problem can be selected from Category 1, 2, 3, or 4, or the numbers 1 to 50, in which case a random selection of Category 4 means that any number from Category 4 can be randomly selected, whereas a random selection of Category 1, 2, or 3 means that any number from Category 1, 2, or 3 can be adaptively selected. In number line problems, numbers selected can be from (CategoryMax−1) to CategoryMax. Thus, if CategoryMax is 5, then the numbers to be selected from are 26 to 99 (where numbers 26–50 are from Category 4=CategoryMax−1, and numbers 51–99 are from Category 5=CategoryMax).

Addition, Subtraction, Multiplication, Division

What a Problem Comprises

Basic addition, subtraction, multiplication, and division problems comprise two operands of single digits. Each problem is selected from a problem set as follows:

Addition Problem Set

0 + 0
0 + 1
0 + 2
0 + 3
0 + 4
0 + 5
0 + 6
0 + 7
0 + 8
0 + 9
1 + 0
1 + 1
1 + 2
...
9 + 9

Subtraction Problem Set

0 − 0
0 − 1
0 − 2
0 − 3
0 − 4
0 − 5
0 − 6
0 − 7
0 − 8
0 − 9
1 − 0
1 − 1
1 − 2
...
9 − 9

Multiplication Problem Set

0 × 0
0 × 1
0 × 2
0 × 3
0 × 4
0 × 5
0 × 6
0 × 7
0 × 8
0 × 9
1 × 0
1 × 1
1 × 2
...
10 × 10

Division Problem Set

0/0
0/1
0/2
0/3
0/4
0/5
0/6
0/7
0/8
0/9
1/0
1/1

-continued

½
...
10/10

Although these problem sets are illustrated as separate tables, a single table can comprise problem sets for each math discipline as well, where the different types of problems can be distinguished by a problem type field. In either case, addition, subtraction, multiplication, and division problems each comprise one problem from a problem set.

Category and Problem Selection

In preferred embodiments, a basic addition, subtraction, multiplication, and division problem is determined by adaptively selecting a problem from a problem set. In these problems, the selected problem is the problem to be solved.

In preferred embodiments, adaptive problem selection can also be used in variations of the math disciplines discussed above, including:
  COUNTING BY MULTIPLES
  ADVANCED ADDITION
  ADVANCED SUBTRACTION
  ADVANCED MULTIPLICATION
  LONG DIVISION Counting by Multiples A counting by multiples problem type teaches a student how to count in multiples.

What a Problem Comprises

A counting by multiple problem comprises a multiple to be counted by, the number of groups to be counted, and the maximum value to count to. In preferred embodiments, a counting by multiple problem is selected by selecting one of many categories, wherein each category comprises the elements of a single counting by multiples problem. Within these categories, the multiple to be counted by is calculated by the formula 2+(Category/9), where the integer result is the multiple to count by, and the number of groups to be counted is calculated by the formula 2+(Category modulo 9). The maximum value to count to is the result of (multiple to be counted by X number of groups to be counted). In preferred embodiments, a problem set comprises predetermined categories ranging from 0 to 80 as follows:

| Category | Multiple to be Counted By | Number of Groups to be Counted | Maximum Value to be Counted |
|---|---|---|---|
| 0 | 2 | 2 | 4 |
| 1 | 2 | 3 | 6 |
| 2 | 2 | 4 | 8 |
| 3 | 2 | 5 | 10 |
| 4 | 2 | 6 | 12 |
| 5 | 2 | 7 | 14 |
| 6 | 2 | 8 | 16 |
| 7 | 2 | 9 | 18 |
| 8 | 2 | 10 | 20 |
| 9 | 3 | 2 | 6 |
| 10 | 3 | 3 | 9 |
| 11 | 3 | 4 | 12 |
| 12 | 3 | 5 | 15 |
| 13 | 3 | 6 | 18 |
| 14 | 3 | 7 | 21 |
| 15 | 3 | 8 | 24 |
| 16 | 3 | 9 | 27 |
| 17 | 3 | 10 | 30 |
| 18 | 4 | 2 | 8 |
| 19 | 4 | 3 | 12 |
| 20 | 4 | 4 | 16 |
| 21 | 4 | 5 | 20 |
| 22 | 4 | 6 | 24 |
| 23 | 4 | 7 | 28 |
| 24 | 4 | 8 | 32 |
| 25 | 4 | 9 | 36 |
| 26 | 4 | 10 | 40 |
| 27 | 5 | 2 | 10 |
| 28 | 5 | 3 | 15 |
| 29 | 5 | 4 | 20 |
| 30 | 5 | 5 | 25 |
| 31 | 5 | 6 | 30 |
| 32 | 5 | 7 | 35 |
| 33 | 5 | 8 | 40 |
| 34 | 5 | 9 | 45 |
| 35 | 5 | 10 | 50 |
| 36 | 6 | 2 | 12 |
| 37 | 6 | 3 | 18 |
| 38 | 6 | 4 | 24 |
| 39 | 6 | 5 | 30 |
| 40 | 6 | 6 | 36 |
| 41 | 6 | 7 | 42 |
| 42 | 6 | 8 | 48 |
| 43 | 6 | 9 | 54 |
| 44 | 6 | 10 | 60 |
| 45 | 7 | 2 | 14 |
| 46 | 7 | 3 | 21 |
| 47 | 7 | 4 | 28 |
| 48 | 7 | 5 | 35 |
| 49 | 7 | 6 | 42 |
| 50 | 7 | 7 | 49 |
| 51 | 7 | 8 | 56 |
| 52 | 7 | 9 | 63 |
| 53 | 7 | 10 | 70 |
| 54 | 8 | 2 | 16 |
| 55 | 8 | 3 | 24 |
| 56 | 8 | 4 | 32 |
| 57 | 8 | 5 | 40 |
| 58 | 8 | 6 | 48 |
| 59 | 8 | 7 | 56 |
| 60 | 8 | 8 | 64 |
| 61 | 8 | 9 | 72 |
| 62 | 8 | 10 | 80 |
| 63 | 9 | 2 | 18 |
| 64 | 9 | 3 | 27 |
| 65 | 9 | 4 | 36 |
| 66 | 9 | 5 | 45 |
| 67 | 9 | 6 | 54 |
| 68 | 9 | 7 | 63 |
| 69 | 9 | 8 | 72 |
| 70 | 9 | 9 | 81 |
| 71 | 9 | 10 | 90 |
| 72 | 10 | 2 | 20 |
| 73 | 10 | 3 | 30 |
| 74 | 10 | 4 | 40 |
| 75 | 10 | 5 | 50 |
| 76 | 10 | 6 | 60 |
| 77 | 10 | 7 | 70 |
| 78 | 10 | 8 | 80 |
| 79 | 10 | 9 | 90 |
| 80 | 10 | 10 | 100 |

Category and Problem Selection

In preferred embodiments, a counting by multiples problem is determined by adaptively selecting a category. Since each category also comprises elements of the problem to be solved, selecting a category comprises selecting the problem to be solved.

Advanced Addition, Advanced Subtraction, Advanced Multiplication, Long Division Advanced addition, advanced subtraction, advanced multiplication, and long division problems comprise a of plurality of problems, wherein each problem is selected from a problem set as illustrated above.

What a Problem Comprises

Advanced Addition

Advanced addition problems comprise two or more operands, where at least one operand comprises more than one digit. The following is an advanced addition problem comprising two operands of 3 digits each:

589
+139

This advanced addition problem is made up of 3 problems, where each problem is a pair of digits in the same column: 5+1, 8+3, and 9+9. In preferred embodiments, where an advanced addition problem comprises more than one operand, only the top two operands will use adaptive problem selection. Furthermore, any operand having fewer than the maximum number of digits in another operand is presumed to be preceded by zeros, so that each column comprises a pair of digits. For example:

801
+091

This advanced addition problem comprises 3 problems: 8+0, 0+9, and 1+1.

Advanced Subtraction

Advanced subtraction problems comprise two operands, where at least one operand comprises more than one digit. The following is an advanced subtraction problem comprising two operands of 4 digits each:

6983
−3218

This advanced subtraction problem is made up of 4 problems, where each problem is a pair of digits in the same column: 6−3, 9−2, 8−1, 3−8. In preferred embodiments, any operand having fewer digits than the other operand is presumed to be preceded by zeros, so that each column comprises a pair of digits. For example:

635
−082

This advanced subtraction problem comprises 3 problems: 6−0, 3−8, and 5−2.

Advanced Multiplication

Advanced multiplication problems comprise a multiplicand and a multiplier, where at least one of the multiplicand or multiplier comprises two or more digits. The following is an advanced multiplication problem comprising a multiplicand and a multiplier:

95
×48

This advanced multiplication problem is made up of 2 problems, where each problem is a pair of digits in the same column: 9×4, and 5×8. In preferred embodiments, any multiplicand having fewer digits than the multiplier, or any multiplier having fewer digits than the multiplicand is presumed to be preceded by zeros, so that each column comprises a pair of digits.

352
×021

This advanced multiplication problem comprises 3 problems: 3×0, 5×2, and 2×1.

Long Division

Long division problems comprise a divisor and a dividend, where at least one of the divisor or dividend comprises two or more digits. The following is a long division problem comprising a divisor and a dividend:

325÷25 where 325 is the dividend, 25 is the divisor, and the result, 13, is the quotient. This long division problem is made up of 2 problems, where each problem is a pair of digits in the same position of the divisor (25) and the quotient (13): 2×1, and 5×3.

Category and Problem Selection

Advanced Addition

The following problem, as presented above, comprises 3 problems:

589
+139

Each problem is a pair of digits in the same column: 5+1, 8+3, and 9+9, where each problem is adaptively selected from a problem set in a process similar to basic addition.

Advanced Subtraction

The following problem, as presented above, comprises 4 problems:

6983
−3218

Each problem is a pair of digits in the same column: 6−3, 9−2, 8−1, 3−8, where each problem is adaptively selected from a problem set in a process similar to basic subtraction.

Advanced Multiplication

The following problem, as presented above, comprises 2 problems:

95
×48

Each problem is a pair of digits in the same column: 9×4, and 5×8, where each problem is adaptively selected from a problem set in a process similar to basic multiplication.

Long Division

The following problem, as presented above, comprises 2 problems:

325÷25 where 325 is the dividend, 25 is the divisor, and the result, 13, is the quotient. Each problem is a pair of digits in the same position of the divisor (25) and the quotient (13): 2×1, and 5×3. Note, however, that the long division problem is not itself a result of selecting problems from a problem set. Instead, a long division problem is derived as follows:

- The number of digits in the divisor is randomly determined to be between 1 and 3 digits.
- The number of digits in the quotient is (Category−(the number of digits in the divisor).)
- Each problem is a pair of digits in the same position of the divisor and quotient, and is selected from a problem set. The least significant digits are adaptively selected first, and then the more significant digits until either the divisor or the quotient is complete. The remaining digits, if any, are randomly selected.
- The dividend is derived by multiplying the divisor and the quotient. If the problem is to have a remainder, then a random number less than the divisor is added to the dividend to produce the final dividend.
- The dividend and divisor are then presented to the user as a long division problem.

In preferred embodiments, CategoryMax ranges from 2 to 12, and Category is randomly selected to range from (CategoryMax−4) to CategoryMax, where Category is not less than 2. Using the steps above, if CategoryMax is 4, and the number of digits in the divisor is randomly selected as 2, then the number of digits in the quotient is also 2. The least significant digits are adaptively selected first. In the above example, the least significant digits would be 5×3 (assuming that 5×3 is a problem in the problem set that is adaptively selected, to be explained below). Next, 2×1 would be generated. If CategoryMax was 5, then the number of digits in the quotient would be 3, and the remaining digit would be randomly selected. Since all digits in both the divisor and quotient have been generated, the dividend can be produced by multiplying the divisor and the quotient, 25×13, to produce 325 as the dividend. The problem can then be solved.

FIRST PREFERRED EMBODIMENT

In a first preferred embodiment, adaptive problem selection is used to guide the selection of a problem. A selected problem can be a problem to be solved, or it can be a subpart of a problem to be solved. For example, in addition, subtraction, multiplication, division, singles counting, singles manipulative counting, group counting, group manipulative counting, and counting by multiples problems, a problem is adaptively selected from a category and then presented to a student to solve. In number line counting, advanced addition, advanced subtraction, advanced multiplication, and long division problems, for example, one or more problems are adaptively selected to form a problem to be solved.

Adaptive problem selection in a first preferred embodiment comprises determining a performance number that corresponds to and measures a student's performance on a given problem, and then making a biased random selection, or randomly selecting a problem based on performance numbers for a plurality of problems, such that the performance number on a given problem biases the selection of that problem on a subsequent selection of a problem. The selection of a problem is biased by a performance number such that the higher a student's performance on a given problem, the lower the probability of the given problem being selected on subsequent problem selections. However, a selected problem does not necessarily mean that the problem had the highest probability of being selected when it was selected.

Student's Performance

A student's performance on a given problem is measured by a performance number in a first preferred embodiment, which is used to bias the selection of the given problem to guide the selection of subsequent problems. A student's performance on a given problem is determined after each response to a single presentation of a problem. A student's performance on a given problem is determined by one or more previous single presentations of the problem in a given math discipline. A student's performance on a single presentation of a problem can be measured in a variety of ways, including whether or not an answer is correct, and the time it takes to respond to a problem.

In a first preferred embodiment, a student's performance on a single presentation can be measured simply by the student's correct or incorrect response: if the student's response is correct, a counter is incremented, and if the student's response is incorrect, or if the student does not respond to the problem within a preconfigured maximum allotted time, the counter is reset to its initialization number. (Alternatively, the counter may be decremented, or the counter may be stopped until it is exceeded.) The student's performance for a given problem, or the performance number, under this method is then equal to the counter, which corresponds to the number of consecutive times the student has answered a given problem correctly, or the number of consecutive correct answers.

A student's performance on a single presentation can also be measured by the student's response time (SRT): if the student's response is correct, the SRT is the actual time it takes the student to correctly solve the problem, and if the student's response is incorrect, or if the student does not respond to the problem within a preconfigured maximum allotted time, the SRT is a predetermined number. The student's performance for a given problem, or the performance number, under this method is then equal to the sum of the previously calculated performance number and the previous student response time, divided by two, the result representing the student's average response time (SART).

The performance number for a given problem is then used to bias the selection of the problem. Using the consecutive correct answers method, the lower a performance number on a given problem, the higher the probability of the given problem being selected on subsequent problem selections, as biased by the problem's corresponding performance number, because if a student has consecutively answered a problem correctly a "lower" number of times than other problems, then that student's practice time needs to be devoted to that problem more so than on other problems. Using the student's average response time method, the higher a performance number on a given problem, the higher the probability of the given problem being selected on subsequent problem selections, as biased by the problem's corresponding performance number, because if a student has taken a "longer" time to correctly answer a given problem, that student's practice time needs to be devoted to that problem more so than on other problems.

In a first preferred embodiment, the consecutive correct answers method is used to determine a student's performance in a counting problem type, and the student's average response time method is used to determine a student's performance in addition, subtraction, multiplication, and division problem types, including variations thereof, discussed above, and a counting by multiples problem type. It is also within the scope of this invention that for any given problem type, a student's performance can be measured by any method discussed in a first preferred embodiment, or other methods not discussed herein. For example, a student's performance on a counting problem can also or alternatively be measured by the student's response time.

Biased Random Selection

In a first preferred embodiment, problem selection is made from a problem set, or a set of all problems to be presented to the student. Furthermore, problem selection is made in one or more passes, wherein a pass is a selection of each problem in a problem set at least once. Initially, an initial pass is made wherein each problem in a problem set is selected only once. A student's performance on each problem is measured against an initial performance number for a given problem and then recorded. The initial performance number represents a predetermined average response time for that problem, and can be uniform for all problems, or individually determined. Initializing each problem properly biases the problem for selection on subsequent passes. After the initial pass, problems are adaptively selected so that a problem in a problem set can be selected one or more times in any given pass. A student's performance, along with other variables affecting a student's performance, such as a CategoryMax variable, is recorded and saved for problem selection on subsequent passes and sessions.

Figure 3:
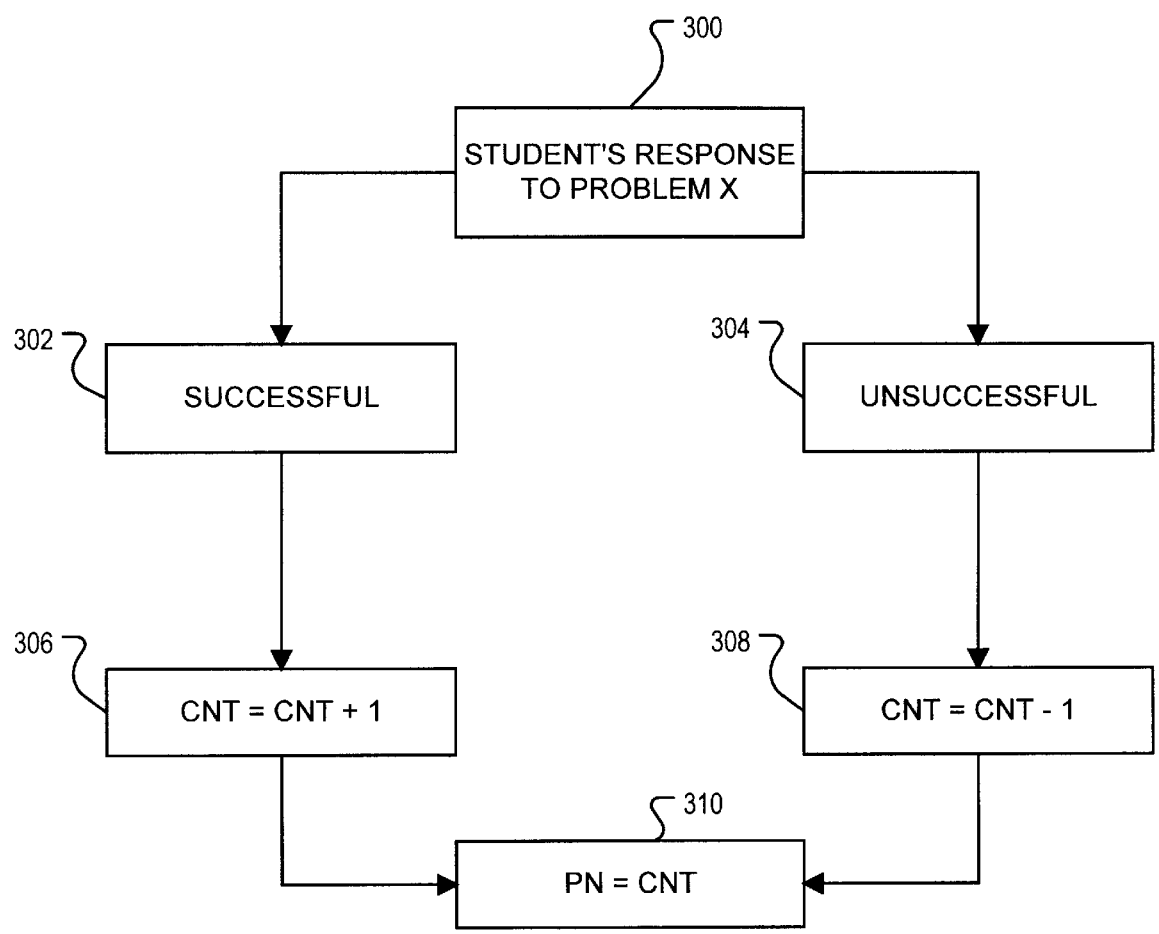
FIG. 3 illustrates an adaptive problem selection method in a first preferred embodiment, where a student's performance on a given problem is measured by the number of consecutive times a problem is answered correctly.

In a first preferred embodiment, problem selection can be made from a focus list made up of a FOCUS number of problems in order to increase the repetition rate of problems with which a student is having the most difficulty. A focus list is a subset of an entire problem set comprising the difficult problems. FOCUS, i.e. the number of problems in a focus list, is a predetermined number, but can be varied during a student's session. In a preferred embodiment, FOCUS is decremented at the end of a student's session if the student's average number of correct answers is below a configurable value, and FOCUS is incremented during a session whenever the student correctly solves a predetermined number of consecutive problems. In a first preferred embodiment, FOCUS is used when a student's performance on a given problem is measured by a student's average response time. It is also within the scope of this invention, however, that FOCUS may be used when the student's performance on a given problem is measured by the number of consecutive times a problem is answered correctly. Also, to ensure that every problem is occasionally selected, even those that the student does not have particular difficulty with, a performance number for every problem that is not selected on a given problem selection is incremented to increase its chances of being selected on subsequent problem selections.
Student's Performance: Number of Consecutive Times Problem Correctly Solved In a first preferred embodiment, a student's performance on a counting problem is measured by the number of consecutive times a student correctly solves the problem. As illustrated in FIG. 3, a student's performance on a single presentation of a problem is measured by the student's response 300. If the student's response is successful (i.e., correct) 302, a counter for that problem is incremented 306. If the student's response is unsuccessful (i.e., response is incorrect, or a response is not entered within a predetermined maximum allotted time) 304, the counter for that problem is decremented, or is reset to its initialization number 308. The performance number 310, which represents the student's performance on the given problem, is then set to the value of counter 306, 308, which is the number of times that the student has correctly solved the given problem. On the next problem selection, the performance number 310 is used to bias the selection of the problem. In this way, adaptive problem selection can vary the selection of problems such that the selection is biased in accordance with the student's performance on problems (as measured by corresponding performance numbers), and the selection is random, wherein a probability associated with a selection alleviates any significant amount of predictability in the selection of a problem.

Consider the following table of ten successive problem selections (S1–S10), and five problems in the problem set (P1–P5), where each problem initially has a performance number (PN) initialized to 1, and each set of performance numbers is used in the problem selection number in the same row:

TABLE 1

| | PN initialized to 1; PN = CNT | | | | |
|---|---|---|---|---|---|
| | P1 | P2 | P3 | P4 | P5 |
| S1 | PN:1 | PN:1 | PN:1 CORRECT CNT = PN + 1 | PN:1 | PN:1 |
| S2 | PN:1 CORRECT CNT = PN + 1 | PN:1 | PN:2 | PN:1 | PN:1 |
| S3 | PN:2 INcorrect CNT = 1 | PN:1 | PN:2 | PN:1 | PN:1 |
| S4 | PN:1 | PN:1 CORRECT CNT = PN + 1 | PN:2 | PN:1 | PN:1 |
| S5 | PN:1 | PN:2 | PN:2 | PN:1 CORRECT CNT = PN + 1 | PN:1 |
| S6 | PN:1 | PN:2 | PN:2 | PN:2 | PN:1 CORRECT CNT = PN + 1 |
| S7 | PN:1 | PN:2 | PN:2 | PN:2 | PN:2 CORRECT CNT = PN + 1 |
| S8 | PN:1 CORRECT CNT = PN + 1 | PN:2 | PN:2 | PN:2 | PN:3 |
| S9 | PN:2 | PN:2 | PN:2 | PN:2 | PN:3 INcorrect CNT = 1 |
| S10 | PN:2 | PN:2 | PN:2 | PN:2 | PN:1 |

Where a student's performance on a given problem is measured by the number of consecutive times that the problem is answered correctly, the corresponding performance number biases the selection of the problem such that the probability of the problem being selected is higher than another problem on the next selection if the number of times it was answered correctly is lower than the other problem. The degree of a performance number's bias for a given problem is related to the probability of the problem being selected.

This probability can be computed by first determining a total performance number for all problems (P1 through P5), which can be calculated as the sum of all performance numbers in the problem set. Using this calculation, the total performance number would be 11 (2+2+2+2+3). Since each given problem's performance number is inversely proportional to its probability of selection (the fewer the performance number, the greater its probability of selection), each problem's performance number should then be converted to be proportional to its probability of selection by subtracting its performance number from the total performance number. Thus, converted performance numbers for P1, P2, P3, and P4 would be 9 (11−2), and the converted performance number for P5 would be 8 (11−3), so that a problem with a lower converted performance number has a lower probability of selection. A converted total performance number is then calculated to be 44 (9+9+9+9+8).

The probability of selection for a given problem is that problem's converted performance number divided by the converted total performance number. Thus, the probability of selection for P1, P2, P3, and P4 is approximately 20% (9/44), and the probability of selection for P5 is approximately 18% (8/44). This translates to P1, P2, P3, and P4 having a higher probability of selection than P5 since P1, P2, P3, and P4 have lower performance numbers (not converted performance numbers), or a fewer number of consecutive correct answers, than P5. Furthermore, this translates to performance numbers for P1, P2, P3, and P4 having a greater degree of bias for their corresponding problems than P5.

After S1, P3 has a lower probability of being selected than P1, P2, P4, and P5 on the next selection, S2, because P3's performance number (PN) is higher than the PN of other problems. (It does not follow, however, that P1, P2, P4, or P5 will necessarily be selected on the next selection. Statistically speaking, P1, P2, P4, and P5 just have a higher probability than P3 of being selected on the next selection.) On the next problem selection, S2, each performance number is used to bias the selection of its corresponding problem. As a result, since P3 has a higher performance number than other problems (i.e. most number of consecutive correct answers), the probability of selection for P3 is lower. On S2, P1 is selected and answered correctly, and PN is incremented. On the next problem selection, performance numbers are again used to bias selection for each problem. On S3, P1 has an equal probability of being selected as P3, but a lower probability than P2, P4, and P5. On S3, P1 is selected again. However, since it is answered incorrectly this time, its PN is reset so that has an equal probability of being selected as P2, P4, and P5.

On each problem selection, a biased random selection is made such that a probability of a problem being selected is biased by its performance number (as described above), yet its selection is random as determined by a random process of selection. The following illustrates one way to implement biased random selection based on performance numbers:

A random number from 0 to the converted total performance number (i.e. 44) is generated.
Assume that number is 39.
Problems are ordered from the lowest to highest converted performance number (CPN).
Starting with the random number, subtract from the result each converted performance number until the result (R) is less than or equal to zero.

| P5 (CPN = 8) | P4 (CPN = 9) | P3 (CPN = 9) | P2 (CPN = 9) | P1 (CPN = 9) |
|---|---|---|---|---|
| 39 − 8 = 31 R = 31 | 31 − 9 = 22 R = 22 | 22 − 9 = 13 R = 13 | 13 − 9 = 4 R = 4 | 4 − 9 = −5 R = −5 |

The problem where the result is less than or equal to zero is the problem that is chosen. In this example, that problem is P1, where the result, R, is −5.

Another way to implement biased random selection based on performance numbers is to simulate the "marbles in a bowl" method, wherein the probability of an x-colored marble being selected is dependent upon the number of x-colored marbles there are in the bowl. For instance, if there are 40 marbles in a bowl, 4 of which are black, 10 of which are white, and the remaining 26 of which are red, then the probability of selection for a black marble is 10% (4/40); a white marble is 25% (10/40); and a red marble is 65% (26/40), so that the probability of any given colored marble being selected is dependent on the number of its respective marbles in the bowl.

To make this analogy in selecting problems instead of marbles, assume that P1 has a performance number of 4; P2 has a performance number of 10; P3 has a performance number of 26; and the total performance number is 40. A converted performance number for P1 would be 36 (40−4); for P2 would be 30 (40−10); for P3 would be 14 (40−26), and a converted total performance number would then be 80 (36+30+14). To simulate the "marbles in a bowl" biased random selection, an array can be created, for example, where the size of the array is a variable that is equal to the converted total performance number. Each cell in the array is then populated with an identifier representing the appropriate problem. For example, cells 1 to 36 (36 cells) in the array can be populated with "1" to represent P1; cells 37 to 66 (30 cells) can be populated with "2" to represent P2; and cells 67 to 80 (14 cells) can be populated with "3" to represent P3. A number between 1 and 80 is then randomly generated. Although each number has an equal probability of being selected, P1 has the greatest probability of being selected since it will be selected if any one of its 36 numbers is generated; P2 has the second greatest probability of being selected since it will be selected if any one of its 30 numbers is generated; and P3 has the least probability of being selected since it will be only selected if one of its 14 numbers is generated.

Although the cells in the example above are populated in the order of the problems, the cells can be populated in any manner. Furthermore, a fixed size array can also be used, such that the number of cells populated by a given problem is proportionately equal to the problem's probability of selection, as determined by its performance number. For example, in a fixed size array of 100, the number of cells populated by P1 would be (36/80)×100=45, where 36/80 is P1's probability of selection, and 100 is the size of the fixed array. However, where a problem's probability of selection is not whole (i.e., P2's probability of selection is 37.5%, or 30/80), further considerations are needed to resolve how the array cells are to be populated.

Student's Performance: Student's Average Response Time (SART)

Figure 4:
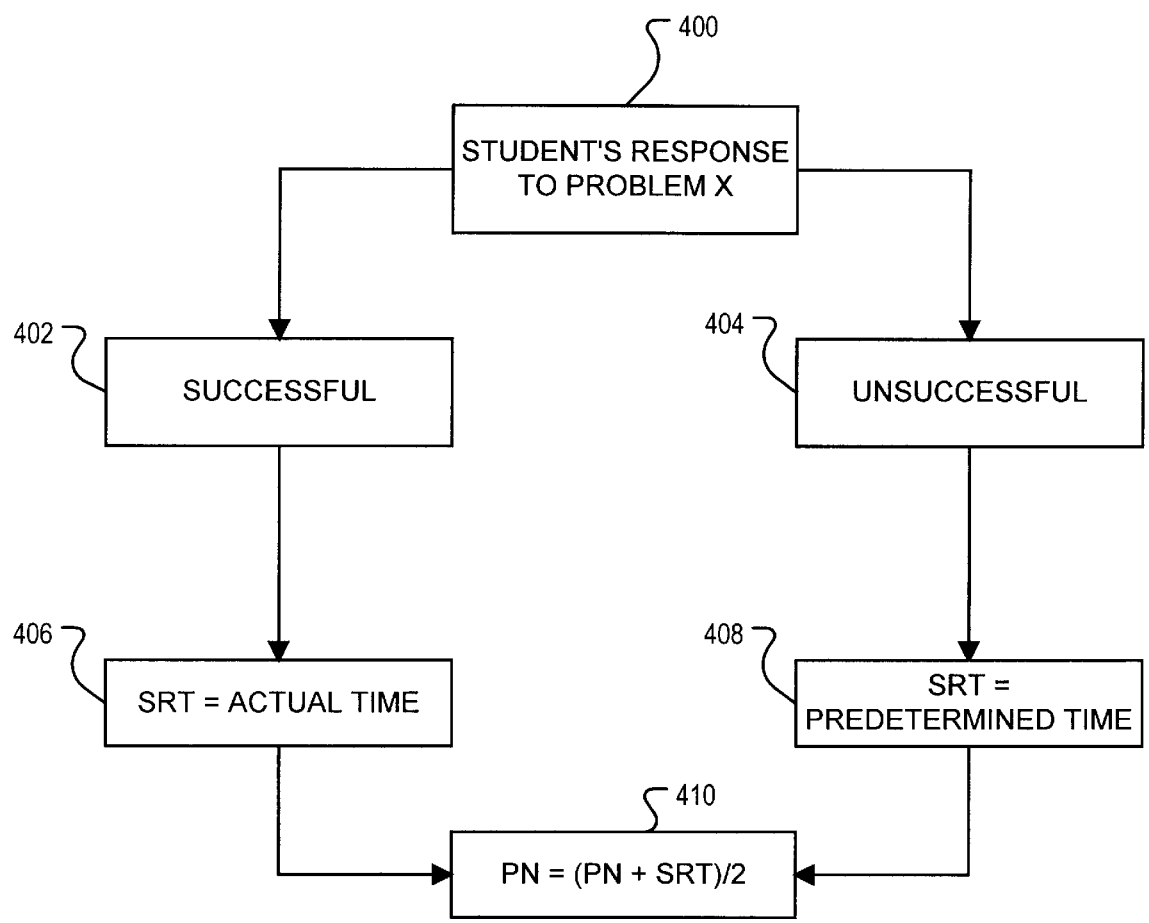
FIG. 4 illustrates an adaptive problem selection method in a first preferred embodiment, where a student's performance on a given problem is measured by the student's average response time.

In a first preferred embodiment, a student's performance on an addition, subtraction, multiplication, or division problem is measured by the student's average response time (SART). As illustrated in FIG. 4, a student's performance on a single presentation of a problem is measured by the student's response time (SRT) for that problem 400. If the student's response is successful (i.e., correct) 402, the student's response time is the actual time it took the student to solve the problem 406. If the student's response is unsuccessful, (i.e., response is incorrect, or the student does not respond within a preconfigured maximum allotted time) 404, the student's response time is a predetermined time 408. A performance number (PN) 410, which is a measurement of the student's performance on the given problem, is calculated as the student's average response time for correctly solving the problem, including successful and unsuccessful responses. On the next problem selection, the performance number 410 is used to bias the selection of the problem. In this way, adaptive problem selection can vary the selection of problems, such that the selection is biased in accordance with the student's performance on problems (as measured by corresponding performance numbers), and random, wherein a probability associated with a selection alleviates any significant amount of predictability in the selection of a problem.

Consider the following table of ten successive problem selections (S1–S10), and five problems in the problem set (P1–P5), where each problem initially has a performance number (PN) initialized to 7, and each set of performance numbers is used in the problem selection number in the same row:

TABLE: 2

PN initialized to 7;
PN = (PN + SRT)/2

| | P1 | P2 | P3 | P4 | P5 |
|---|---|---|---|---|---|
| S1 | PN:7 | PN:7 | PN:7<br>SRT: 8 | PN:7 | PN:7 |
| S2 | PN:7<br>SRT: 6.5 | PN:7 | PN:7.5 | PN:7 | PN:7 |
| S3 | PN: 6.75 | PN: 7 | PN: 7.5<br>SRT: 10 | PN: 7 | PN: 7 |
| S4 | PN: 6.75 | PN: 7<br>SRT: 5 | PN: 8.75 | PN: 7 | PN: 7 |
| S5 | PN: 6.75 | PN: 6 | PN: 8.75 | PN: 7<br>SRT: 7.5 | PN: 7 |
| S6 | PN: 6.75 | PN: 6 | PN: 8.75 | PN: 7.25 | PN: 7<br>SRT: 6.5 |
| S7 | PN: 6.75 | PN: 6 | PN: 8.75<br>SRT:7 | PN: 7.25 | PN: 6.25 |
| S8 | PN: 6.75 | PN: 6 | PN: 7.88 | PN: 7.25<br>SRT: 6 | PN: 6.25 |
| S9 | PN: 6.75 | PN: 6 | PN: 7.88<br>SRT: 6 | PN: 6.63 | PN: 6.25 |
| S10 | PN: 6.75 | PN: 6 | PN: 6.94 | PN: 6.63 | PN: 6.25 |

Where a student's performance on a given problem is measured by the student's average response time, the corresponding performance number biases the selection of the problem such that the probability of the problem being selected is higher than another problem on the next selection if the student's average response time for the problem is higher than another problem. The degree of a performance number's bias for a given problem is related to the probability of the problem being selected. This probability can be computed by first calculating the sum of all performance numbers for each of the problems (P1 through P5), which in this case is 35 (6.75+6+8.75+7.25+6.25). The probability of selection for a given problem is that problem's performance number divided by the sum. Thus, the probability of selection for P1 is 19% (6.75/35); P2 is 17% (6/35); P3 is 25% (8.75/35); P4 is 21% (7.25/35); P5 is 18% (6.25/35). This translates to P3 having a higher probability of selection than P1, P2, P4, and P5, for example, because P3 has a higher performance number, or a greater student response time, than the other problems. Furthermore, this translates to performance number for P3 having a greater degree of bias for its corresponding problem than the other problems.

After S1, P3 has a higher probability of being selected than P1, P2, P4, or P5 on the next selection, S2, because P3's performance number (PN) is higher than the PN of other problems. (It does not follow, however, that P3 will necessarily be selected on the next selection. Statistically speaking, P3 just has a higher probability than P1, P2, P4, or P5 of being selected on the next selection.) On the next problem selection, S2, each performance number is used to bias the selection for its corresponding problem. Since P3 has a higher performance number (i.e. higher average response time), the probability of selection for P3 will also be higher. On S2, P1 is selected, and its student response time (SRT) recorded. On the next problem selection, the performance numbers are again used to bias selection of corresponding problems. On S3, P3 has the greatest probability of being selected, and is in fact selected. Its student response time is measured, and performance number calculated for the next problem selection.

In a first preferred embodiment, FOCUS is used when a student's performance on a given problem is measured by a student's average response time to increase the repetition rate of problems in the focus list. Using TABLE 2 as an example, where there are 5 problems in a problem set, and assuming FOCUS is initialized to 3, the focus list will initially comprise all problems in the problem set because each problem has an equal probability of being selected. In S5, the focus list comprises P3, P4, and P5, the problems with the highest student's average response time, and therefore the problems with which the student is having the most difficulty, where P4 and P5 are tied. In S5, P4 is selected, where the student's response time increases the performance number for that problem, and maintains the focus list in S6, to P3, P4, and P5. In S6, problem selection is again made from P3, P4, and P5. In S7, the focus list changes to P1, P3, and P4.

On each problem selection, a biased random selection is made such that a probability of a problem being selected is biased by its performance number (as described above), yet its selection is random as determined by a random process of selection. The following illustrates one way to implement a random process of selection based on performance numbers:

A random number from 0 to the total performance number (i.e. 35) is generated.
Assume that number is 4.
Problems are ordered from the lowest to highest performance number.
Starting with the random number, subtract from the result (R) each performance number until the result is less than or equal to zero.

| P2<br>(PN = 6) | P5<br>(PN = 6.25) | P1<br>(PN = 6.75) | P4<br>(PN = 7.25) | P5<br>(PN = 8.75) |
|---|---|---|---|---|
| 4 − 6 = −2<br>R = −2 | — | — | — | — |

The problem where the result is less than or equal to zero is the problem that is chosen. In this example, that problem is P2, where the result, R, is −2. The "marbles in a bowl" method, discussed supra, can also be simulated to implement biased random selection here.

Both TABLE 1 and TABLE 2 illustrate how the determination of a performance number for each problem, and the selection of problems based on their corresponding performance numbers allow adaptive problem selection to focus the student's practice time where most needed, without any significant degree of predictability as to what problem is presented next. In TABLE 1, S6, for example, performance numbers indicate that the student needs more practice on P1 and P5 than the student needs on P2, P3, or P4. Adaptive problem selection allows a biased random selection to be made such that the probability of P1 or P5 being selected is greater than the probability of P2, P3, or P4 being selected, wherein a greater probability of selection does not guarantee selection. In TABLE 2, S5, for example, performance numbers indicate that the student needs more practice on P3 than the other problems. Again, adaptive problem selection allows biased random selection to be made such that the probability of P5 being selected is greater than the probability of the other problems being selected, wherein a greater probability of selection does not guarantee selection.

Second Preferred Embodiment

In a second preferred embodiment, adaptive problem selection is used to guide the selection of a category comprising one or more problems. A category comprises problems that are grouped according to a classification scheme. An example of a classification scheme is that found in counting problems, supra, where each category comprises a plurality of problems that are classified according to a range of numbers. Another example of a classification scheme is classification according to problem type, where each category comprises a group of problems of the same problem type (e.g., addition, subtraction, multiplication, division). In both types of classification schemes, a category may comprise one problem, as in the case of counting by multiples problems, or a category may comprise multiple problems, as in the case of addition, subtraction, multiplication, and division problem sets. Where a category comprises only one problem, the selection of a category is essentially the selection of a problem. The selection of a problem can be made in the manner described in a first preferred embodiment, supra, for using adaptive problem selection to select a problem, or the selection of a problem can be made as described in a second preferred embodiment, infra.

Adaptive problem selection in a second preferred embodiment comprises determining a category performance determinant that corresponds to and measures a student's performance in a given category, and then making a biased random selection, or randomly selecting a category based on category performance determinants for a plurality of categories, such that the category performance determinant for a given category biases the selection of that category on a subsequent selection of a category.

For example, if a student has a higher performance in Category 2 counting problems than Category 3 counting problems, the student's poorer performance in Category 3 biases the selection of that category such that Category 3 will have a higher probability of being selected than Category 2. Similarly, if a student correctly answers a higher percentage of addition problems than subtraction problems, then the student's poorer performance in subtraction problems biases the selection of that category such that a subtraction problem type will have a higher probability of being selected than an addition problem type. However, the selected category is not necessarily the category with the highest probability of being selected. In a second preferred embodiment, selection of a category can be the basis for selection of a problem. In counting problems, for example, an adaptive selection of Category 6 provides the basis for selecting a problem from Category 6, or the numbers 100 to 399. Similarly, an adaptive selection of an addition problem type provides the basis for selecting a problem from an addition problem set.

Student's Performance

A student's performance in a given category is measured by a category performance determinant in a second preferred embodiment, which is used to bias the selection of the given category to guide the selection of subsequent categories. A student's performance in a given category is determined when a problem of a particular type is being selected. A student's performance in a given category is determined by the student's performance on problems in the category. A student's performance in a category can be determined in a number of ways, including the total number of times that problems in the category that are correctly answered; the total response time in a given category; the number of consecutively correctly answered problems; and any combination of these factors thereof.

Figure 5:
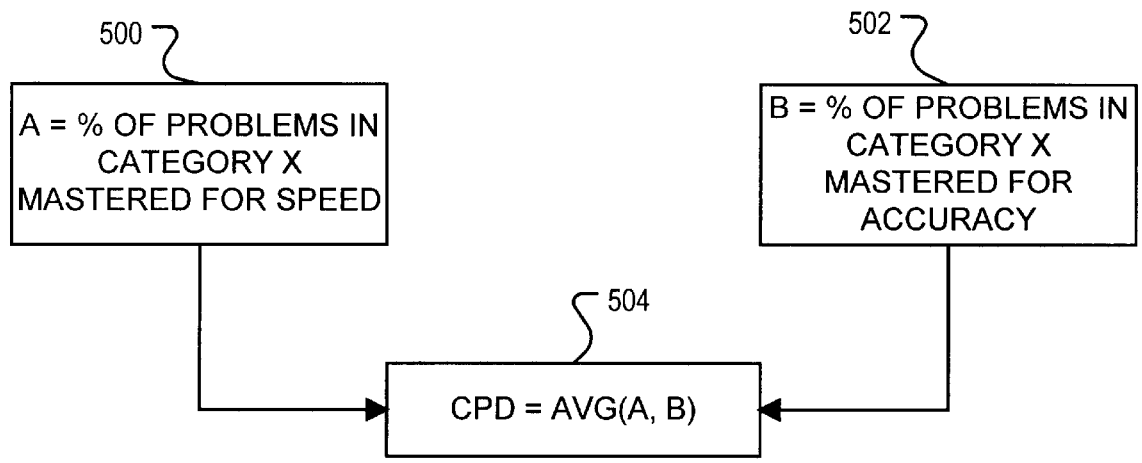
FIG. 5 illustrates an adaptive problem selection method in a second preferred embodiment, where a given category comprises one problem.

In a second preferred embodiment, a student's performance in a category is determined by the percentage of problems in a problem set that are mastered, where the numerical equivalent of the percentage is used as the category's category performance determinant. In a category comprising multiple problems, as illustrated in FIG. 5, the percentage of problems mastered, or the category performance determinant (CPD), is determined by taking the average 504 of the percentage of problems in a problem set mastered for speed 500 and the percentage of problems in a problem set mastered for accuracy 502 (number of consecutively correctly answered problems). The category performance determinant 504 is then used to bias the selection of the category on the next category selection. This calculation can be used for addition, subtraction, multiplication, division, and counting problems, for example.

A problem is considered mastered for accuracy if it has been answered correctly a preconfigured number of times for its category. The occurrence of the mastery event means that the problem is mastered for accuracy. The Percent of Problems Mastered for Accuracy for a given category is (100*(TOTAL NUMBER OF CONSECUTIVE CORRECT ANSWERS IN THE PROBLEM SET)/(MASTERY STANDARD FOR ACCURACY*NUMBER OF PROBLEMS IN PROBLEM SET)). A problem is considered mastered for speed if it has been answered at or below a preconfigured time for its category. The occurrence of the mastery event means that the problem is mastered for speed. The Percent of Problems Mastered for Speed for a given category is (100*(1/(AVERAGE RESPONSE TIME))/(1/(STANDARD TIME FOR MASTERY))). The Percent Mastered for a category comprising multiple problems is the average of two values: Percent Mastered For Speed and Percent Mastered For Accuracy.

For example, assume that the Standard Time For Mastery is configured as 5 or fewer seconds, and the Mastery Standard for Accuracy is configured as 10 or more consecutive times. If there are 100 addition problems in an addition problem set, and the student's average response time in the problem set is 4.8 seconds (add the student's performance on each problem and divide by the total number of problems), and the number of total consecutive correct answers in the problem set is 740 (i.e., in 5 passes of the problem set, problem 1 was correctly answered 7 consecutive times, problem 2 was correctly answered 5 consecutive times, etc.), then:

Percent Mastered for Speed=(100*(1/4.8)/(1/5.0))=105%

Percent Mastered for Accuracy=(100*((740)/(10*100)))=74%

Percent Mastered=(105+74)/2=89.5%

Similarly, if there are 81 subtraction problems in a subtraction problem set, and the student's average response time in the problem set is 5.2 seconds, and the number of total consecutive correct answers in the problem set is 695, then:

Percent Mastered for Speed=(100*(1/5.2)/(1/5.0))=95%

Percent Mastered for Accuracy=(100*((695)/(10*81)))=85.8%

Percent Mastered=(95+85.8)/2=90.4%

The category performance determinant (CPD) for a given category, or Percent of Mastery, is then used to determine a probability of selection for the category, discussed below.

Figure 6:
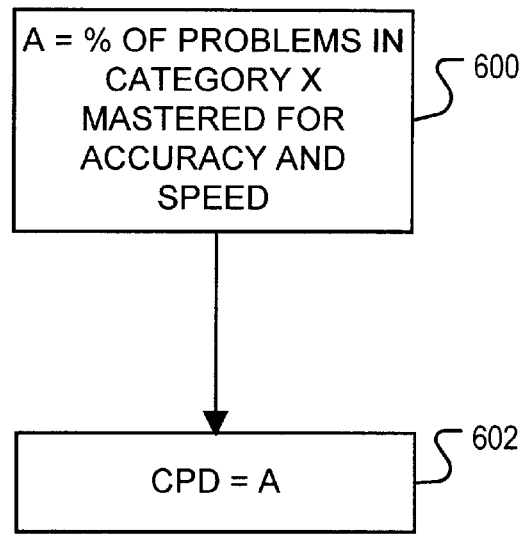
FIG. 6 illustrates an adaptive problem selection method in a second preferred embodiment, where a given category comprises a plurality of problems.

In a category comprising one problem as illustrated in FIG. 6, the percentage of problems mastered is determined by the number of problems in the problem set that are mastered. This calculation can be used for counting by multiples problems, for example. In a second preferred embodiment, a problem is mastered if the problem is mastered for accuracy and speed, i.e., the problem has a minimum number of consecutive correct answers equal to or greater than a configured minimum, and the average response time over those answers is equal to or lower than a configured minimum. The percentage of problems mastered 600 is the category performance determinant 602, which is then used to bias the selection the category on the next category selection. The occurrence of the mastery event means that the problem is mastered. The Percent of Problems Mastered for a given category comprising a single problem is (TOTAL NUMBER OF PROBLEMS MASTERED IN THE PROBLEM SET)/(NUMBER OF PROBLEMS IN PROBLEM SET)).

In counting by multiples problems, for example, assume that the Standard Time For Mastery is configured as 5 or fewer seconds, and the Mastery Standard for Accuracy is configured as 10 or more consecutive times. If a student has previously answered Category 5 correctly 13 consecutive times (by entering multiples of 2 up to the value 14, supra, on 13 different single presentations), and has answered the category on all previous presentations at an average of 4.3 seconds, then the student has achieved a level of mastery for that Category, or problem. If there are 65 categories (65 problems), and a student masters 40 of those categories, then the Percent of Mastery for the category is (40/65)=61.5%.

Biased Random Selection

In a second preferred embodiment, category selection is made from a number of categories, each of which comprise a number of problems. For example, where problem presentation comprises a mixture of addition and subtraction problems, a category will be adaptively selected based upon a student's performance on problems in that category, i.e. addition or subtraction. Selection of a category can then be the basis for selection of a problem within the category, so if addition is adaptively selected as a category, then a problem in an addition problem set can be adaptively selected based on adaptive selection of problems, discussed, supra.

To determine a student's performance in a given category (i.e. Percent of Mastery) described above, the following should be recorded and saved:

Student's performance on a problem (according to the problem type, described, supra);

Highest total number of consecutive correct answers (if a student correctly answers 5 consecutive times, misses twice, and then correctly answers 7 consecutive times, this statistic will be 7);

Average time to solve problem (if this is not the measure of the student's performance on a given problem).

The degree of a category performance determinant's bias for a given category is related to the probability of the category being selected. In adaptive problem selection under a second preferred embodiment, a category with the lowest percentage mastered will be preferred in a manner proportionate to the Percentage of Mastery, or category performance determinant, for each category. In the examples above, addition problem types would have a higher probability of selection than subtraction problem types because addition problem types have a lower percentage of mastery (89.5%) than subtraction problem types (90.4%). On the other hand, counting by multiples problem types would have a higher probability of selection than both addition and subtraction problem types because counting by multiples problem types have a lower percentage of mastery (61.5%) than the other problem types. Under this measure of performance, the more problems there are in a category that have been mastered, the lower the probability of that category being selected on the next selection. In this way, adaptive problem selection can vary the selection of categories such that the selections are biased in accordance with a student's performance in the categories (as measured by corresponding category performance determinants), and the selections are random, wherein a probability associated with a selection alleviates any significant amount of predictability in the selection of a category.

The probability of selection can be computed in similar fashion to a first preferred embodiment. For example, if the percentage of mastery for addition problem types is 89.5%, and the percentage of mastery for subtraction problem types is 90.4%, then the probability of selecting each category can be computed as follows:

for addition problem types, the probability of selection can be computed as 89.5/179.9, or 49.7%, where 89.5 is the category's category performance determinant, and 179.9 (or, 89.5+90.4) is the total category performance determinant;

for subtraction types, the probability of selection can be computed as 90.4/179.9, or 50.2%, where 90.4 is the category's category performance determinant, and 179.9 (or, 89.5+90.4) is the total category performance determinant.

On each category selection, a biased random selection is made such that a probability of a problem being selected is biased by its category performance determinant (as described above), yet its selection is random as determined by a random process of selection. The following illustrates one way to implement a random process of selection based on category performance determinants:

A random number from 0 to the total category performance determinant (i.e. 179.9) is generated. Assume that number is 96.

Categories are ordered from the lowest to highest category performance determinant.

Starting with the random number, subtract from the result (R) each category performance determinant until the result is less than or equal to zero.

| Category Addition (PN = 89.5) | Category Subtraction (PN = 90.4) |
|---|---|
| 96 − 89.5 = 6.5<br>R = 6.5 | 6.5 − 90.4 =<br>−83.9<br>R = 83.9 |

The category where the result is less than or equal to zero is the category that is chosen. In this example, that category is Category Subtraction, where the result, R, is −83.9. As in a first preferred embodiment, the "marbles in a bowl" method, discussed supra, can also be simulated to implement biased random selection in a second preferred embodiment.

While adaptive problem selection, as described herein, has been directed to math problems, it is to be understood that adaptive problem selection is an apparatus and method that may be used to adaptively select other types of problems. For example, adaptive problem selection can be used in spelling, geography, and chemistry. Furthermore, it is to be understood that adaptive problem selection is an apparatus and method that may be used to adaptively select elements or categories of elements, where the elements are other than problems. For instance, adaptive problem selection can be used to adaptively select:

A person from a pool of sweepstakes entrants, where a person has a higher probability of being selected (i.e., winning the sweepstakes) if he or she has more magazine orders. If a category is to be selected, a category could represent all persons residing on the same street, where the category (i.e., group of people residing on the same street) has a higher probability of winning the sweepstakes if its residents have more magazine orders.

An sales employee in an organization, where the employee has a higher probability of being selected to win a vacation if that employee has higher sales. If a category is to be selected, a category could represent all sales employees in the same sales department (i.e., West Area, Central Area, etc.), where the category (i.e., sales employees in the same sales department) has a higher probability of winning a vacation if the sales employees in the same department have higher sales numbers.

Adaptive problem selection can also be used to select a license number from all license numbers in a given state, where a license number has a lower probability of being selected (i.e. to renew the license by exam) if there are fewer traffic violation points associated with the license number. If a category is to be selected, a category could represent all license numbers starting with the same first 3 characters (i.e., "011"), where the category (i.e., license numbers starting with "011") has a lower probability of being selected if there are fewer traffic violation points associated with the license numbers in that category.

In this regard, adaptive problem selection can be used to select a category based on a category's corresponding category performance determinant, where a category comprises a number of elements, and where a category performance determinant is a measurement associated with the category. In the examples above, a category performance determinant would be, respectively:

Number of magazine orders.
Sales dollars.
Traffic violation points.

As discussed above, where a category comprises only one element, the selection of a category is essentially the selection of an element.

Adaptive problem selection is a powerful tool that enables selection of both problems and categories of problems based on a student's performance. By recording and saving a student's performance on problems and categories of problems, future problems and categories can be adaptively selected, that is, selected in a frequency proportionate to a student's performance on a given problem or in a given category. Adaptive problem selection allows a problem to be randomly selected so there is no predictability as to the next problem to be solved, yet biases the selection of a problem so that a given problem will eventually be selected.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for selecting a category, comprising
   a. a number of computer readable media; and
   b. computer readable program code stored on said number of computer readable media, said computer readable program code comprising:
      i. program code for determining a category performance determinant for each of a plurality of categories, wherein said each of a plurality of categories comprises a number of elements, and wherein:
         (1) a given category performance determinant corresponds to a given one of said plurality of categories; and
         (2) said given category performance determinant represents a measurement associated with said given one of said plurality of categories; and
      ii. program code for making a biased random selection of a category, wherein each category performance determinant biases the selection of its corresponding category in said biased random selection.

2. Apparatus as in claim 1, wherein said number of elements in said each of said plurality of categories is one.

3. Apparatus as in claim 1, wherein each of said number of elements is a problem.

4. Apparatus as in claim 3, wherein said each of said number of elements is the same problem type.

5. Apparatus as in claim 3, wherein said category performance determinant represents a percentage of problems mastered in said given one of said plurality of categories.

6. Apparatus as in claim 5, wherein said percentage of problems mastered in said category is determined by calculating an average of:
   a. a percentage of problems mastered for speed; and
   b. a percentage of problems mastered for accuracy.

7. Apparatus as in claim 5, wherein said given category performance determinant biases the selection of its corresponding category in said biased random selection such that a probability of selecting said corresponding category is higher than a different category if a category performance determinant corresponding to said corresponding category is greater than a category performance determinant corresponding to said different category.

8. Apparatus as in claim 1, wherein said category performance determinant represents at least one of a plurality of measurements, said plurality of measurements comprising:

a. a number of points;

b. a number of orders; and c. a dollar amount.

9. Apparatus as in claim 1, wherein said computer readable program code additionally comprises program code for selecting an element from a selected category, wherein said category comprises a plurality of elements.

10. Apparatus as in claim 1, further comprising a processor operably configured to execute said computer readable program code stored on said computer readable media.

11. An apparatus for selecting a category, comprising:

a. means for determining a category performance determinant for each of a plurality of categories, wherein:

i. a given category performance determinant corresponds to a given one of said plurality of categories; and ii. said given category performance determinant is a measurement associated with said given one of a plurality of categories; and b. means for making a biased random selection of a category, wherein said biased random selection means comprises means for each category performance determinant to bias the selection of its corresponding category in said biased random selection.

12. An apparatus for selecting a problem, comprising:

a. a number of computer readable media; and b. computer readable program code stored on said number of computer readable media, said computer readable program code comprising:

i. program code for determining a performance number for each of a plurality of problems, wherein:

(1) a given performance number corresponds to a given one of said plurality of problems;

(2) said given performance number represents a student's performance on said given one of said plurality of problems; and ii. program code for making a biased random selection of a problem, wherein each performance number biases the selection of its corresponding problem in said biased random selection.

13. Apparatus as in claim 12, further comprising a processor operably configured to execute said computer readable program code stored on said computer readable media.

14. Apparatus as in claim 12, wherein said given performance number represents the number of consecutive times said student has correctly solved said given one of said plurality of problems.

15. Apparatus as in claim 14, wherein said given performance number biases the selection of its corresponding problem in said biased random selection such that a probability of selecting said corresponding problem is higher than a different problem if a first performance number representing the number of consecutive times said student has correctly solved said corresponding problem is less than a second performance number representing the number of consecutive times said student has correctly solved said different problem.

16. Apparatus as in claim 15, wherein each of said given plurality of problems is a counting problem type.

17. Apparatus as in claim 12, wherein said given performance number represents an average time it takes said student to solve said given one of said plurality of problems.

18. Apparatus as in claim 17, wherein said given performance number biases the selection of its corresponding category in said biased random selection such that a probability of selecting said corresponding problem is higher than a different problem if a first performance number representing an average time it takes said student to solve said corresponding problem is greater than a second performance number representing an average time it takes said student to solve said different problem.

19. Apparatus as in claim 18, wherein each of said plurality of problems is one of a plurality of problem types, said problem types comprising addition, subtraction, multiplication, division, and counting by multiples.

20. Apparatus as in claim 12, wherein a performance number corresponding to a given one of said plurality of problems is an average of said student's performance on said given one of said plurality of problems, wherein said student's performance on said given one of said plurality of problems:

a. comprises said student's performance on one or more single presentations of said given one of said plurality of problems; and b. is determined after each of said one or more single presentations of said given one of said plurality of problems.

21. Apparatus as in claim 12, wherein a number of said performance numbers is varied to increase a probability of selecting said number of corresponding problems, wherein said number of corresponding problems are problems not selected on a given problem selection.

22. Apparatus as in claim 12, wherein said given performance number biases the selection of its corresponding problem in said biased random selection such that a probability of selecting said corresponding problem is higher than a different problem if a performance number corresponding to said corresponding problem is less than a performance number corresponding to said different problem.

23. Apparatus as in claim 12, wherein said given performance number biases the selection of its corresponding problem in said biased random selection such that a probability of selecting said corresponding problem is higher than a different problem if a performance number corresponding to said corresponding problem is greater than a performance number corresponding to said different problem.

24. Apparatus as in claim 12, wherein a selected problem is a problem to be solved.

25. Apparatus as in claim 12, wherein a selected problem is a subpart of a problem to be solved.

26. Apparatus as in claim 25, wherein said problem to be solved is one of a plurality of problem types, said plurality of problem types comprising advanced addition, advanced subtraction, advanced multiplication, long division, and counting by multiples.

27. Apparatus as in claim 12, wherein said performance number corresponding to a given one of said plurality of problems represents at least one of a plurality of measurements.

28. Apparatus as in claim 27, said at least one of a plurality of measurements comprising:

a. the number of consecutive times said student has correctly solved said given one of said plurality of problems; and b. an average time it takes said student to correctly solve said given one of said plurality of problems.

29. Apparatus as in claim 12, wherein said plurality of problems is a subset of a problem set, wherein the number of problems in a said subset is greater if said student's performance on problems in said problem set is greater, and said number of problems in a said subset is lower if said student's performance on problems in said problem set is lower.

30. An apparatus as in claim 12, wherein said each of said plurality of problems is one of a plurality of subjects, said subjects comprising:
   a. math;
   b. spelling;
   c. geography; and
   d. chemistry.

31. An apparatus for selecting a problem, comprising:
   a. means for determining a performance number for each of a plurality of problems, wherein:
      i. a given performance number corresponds to a given one of said plurality of problems; and
      ii. said given performance number is a measurement of a student's performance on said given one of said plurality of problems; and
   b. means for making a biased random selection of a problem, wherein said biased random selection means comprises means for a performance number to bias the selection of its corresponding problem in said biased random selection.

32. Apparatus as in claim 31, wherein said bias means comprises means for said given performance number to bias the selection of its corresponding problem in said biased random selection such that said corresponding problem has a higher probability of being selected than a different problem if a performance number corresponding to said corresponding problem is less than a performance number corresponding to said different problem.

33. Apparatus as in claim 31, wherein said bias means comprises means for said given performance number to bias the selection of its corresponding problem in said biased random selection such that said corresponding problem has a higher probability of being selected than a different problem if a performance number corresponding to said corresponding problem is greater than a performance number corresponding to said different problem.

34. A method for selecting a problem, comprising:
   a. determining a performance number for each of a plurality of problems, wherein:
      i. a given performance number corresponds to a given one of a plurality of problems; and
      ii. said given performance number represents a student's performance on said given one of a plurality of problems; and
   b. making a biased random selection of a problem, wherein each performance number biases the selection of its corresponding problem in said biased random selection.

35. A method as in claim 34, wherein a given performance number biases the selection of its corresponding problem in said biased random selection such that said corresponding problem has a higher probability of selection than a different problem if a performance number corresponding to said corresponding problem is less than a performance number corresponding to said different problem.

36. A method as in claim 34, wherein a given performance number biases the selection of its corresponding problem in said biased random selection such that said corresponding problem has a higher probability of selection than a different problem if a performance number corresponding to said corresponding problem is greater than a performance number corresponding to said different problem.

37. A method for selecting a category, comprising:
   a. determining a category performance determinant for each of a plurality of categories, wherein:
      i. a given category performance determinant corresponds to a given one of a plurality of categories; and
      ii. said given category performance determinant represents a measurement associated with said given one of a plurality of categories; and
   b. making a biased random selection of a category, wherein each category performance determinant biases the selection of its corresponding category in said biased random selection.

38. A method as in claim 37, wherein a given category performance determinant biases the selection of its corresponding category in said biased random selection such that said corresponding category has a higher probability of selection than a different category if a category performance determinant corresponding to said corresponding category is greater than a category performance determinant corresponding to said different problem.

39. A method as in claim 37, wherein said measurement associated with a given one of said plurality of categories is a measurement of a student's performance.

40. A computer data signal embodied in a carrier wave, comprising:
   a. a category performance determinant determination source code segment comprising code for generating a category performance determinant for each of a plurality of categories, wherein said each of a plurality of categories comprises a number of elements, and wherein:
      i. a given said category performance determinant corresponds to a given one of a plurality of categories;
      ii. said given category performance determinant represents a measurement associated with said given one of a plurality of categories; and
   b. a category selection source code segment comprising code for making a biased random selection of a category from said plurality of categories, wherein each category performance determinant biases the selection of its corresponding category in said biased random selection.

* * * * *